W. W. VANDERBILT.
Piston-Rod Packings.

No. 140,973. Patented July 15, 1873.

Witnesses.
Chas. Wahlers.
Ernst Bilhuber.

Inventor.
William W. Vanderbilt
per
Van Santvoord & Hauff
Attys

UNITED STATES PATENT OFFICE.

WILLIAM W. VANDERBILT, OF NEW YORK, N. Y.

IMPROVEMENT IN PISTON-ROD PACKINGS.

Specification forming part of Letters Patent No. 140,973, dated July 15, 1873; application filed May 10, 1873.

*To all whom it may concern:*

Be it known that I, WILLIAM W. VANDERBILT, of the city, county, and State of New York, have invented a new and Improved Piston-Rod Packing; and I do hereby declare the following to be a full, clear, and exact description thereof, which will enable those skilled in the art to make and use the same, reference being had to the accompanying drawing forming part of this specification, in which drawing—

Figure 1:
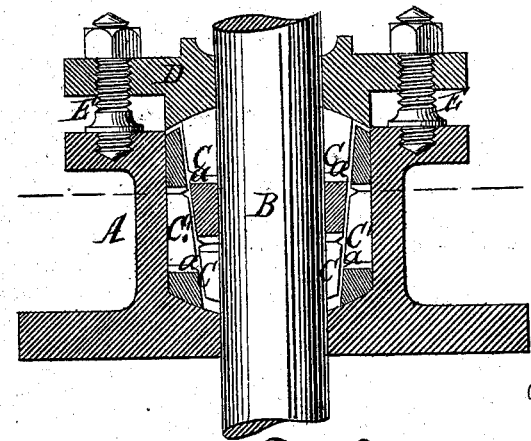
Figure 3:
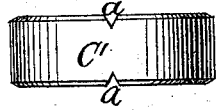
Figure 2:
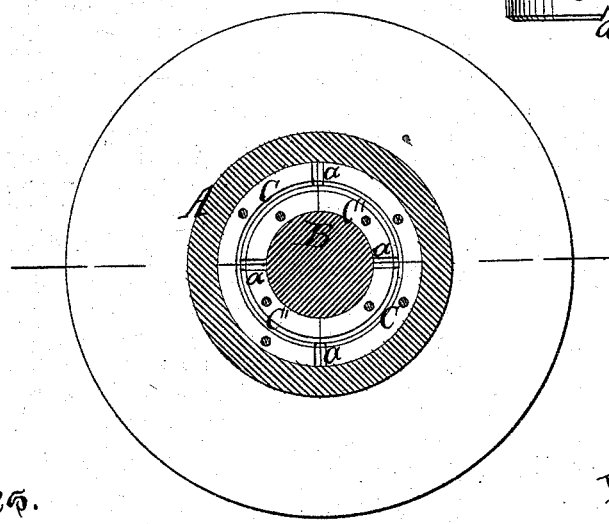

Figure 1 represents a vertical central section of my invention. Fig. 2 is a horizontal section of the same. Fig. 3 is a side view of part of my packing detached.

Similar letters indicate corresponding parts.

This invention consists in a packing composed of two sets of conical rings fitting one within the other, and made in sections, the inner set of rings being inclined in a direction opposite to the outer set, while each section of the inner, and also of the outer set of rings, is provided with a groove or recess, forming a chamber for the reception of condensed water in such a manner that, by these chambers, as soon as the same have filled with condensed water, the escape of steam is effectually prevented, and a steam-tight packing for piston-rods, valve-stems, or shafts, is produced.

In the drawing, the letter A designates the stuffing-box of a cylinder-head or valve-chamber, or the bearing of a shaft, which is to be rendered steam-tight. Through this stuffing-box extends the rod B, and the packing which fills the stuffing-box consists of two sets of rings, C C', which are fitted one inside the other, and which are made conical in opposite directions, as shown in Fig. 1. Each of the rings is made in six (more or less) sections, a detached view of one of which is shown in Fig. 3, and the sections of the outer set of rings are so arranged in relation to the sections of the inner sets that they break joints-as shown in Fig. 2, and, if desired, steady-pins may be used to retain the sections in the required relation toward each other. Each of the sections is provided with a recess or groove, $a$, which extends throughout its entire width, and which forms a chamber which soon fills with condensed water, and effectually prevents the escape of steam through the stuffing-box. The grooves $a$ in the sections of the rings C C' are, by preference, V-shaped, as shown in Fig. 3; but they may be made in any other desirable form or shape, and when the several sections have been arranged in the stuffing-box, as above described, they are held in position by means of the gland D, which is screwed down by screws E.

When the rod or shaft B is set in motion, the steam which may find its way into the stuffing-box condenses rapidly in the grooves $a$, and when these grooves have become filled with water, the escape of steam past the rod or shaft is prevented.

The edges of the packing-rings C C' are rounded or chamfered off, so that when said rings are in position annular channels are formed, which connect the transverse grooves $a$, and which, together with said grooves, form chambers for the reception of condensed water, extending around the stuffing-box.

What I claim as new, and desire to secure by Letters Patent, is—

A packing for rods or shafts, composed of a series of sectional conical rings, each section being provided with a groove or recess, $a$, substantially as and for the purpose described.

W. W. VANDERBILT.

Witnesses:
W. HAUFF,
E. F. KASTENHUBER.